(12) United States Patent
Baughman et al.

(10) Patent No.: US 10,939,203 B2
(45) Date of Patent: Mar. 2, 2021

(54) FORECASTING SOUND IN A LIVE PERFORMANCE TO DETERMINE MICROPHONE POSITION

(71) Applicant: International Business Machines Corporation, Armonk, NY (US)

(72) Inventors: Aaron K. Baughman, Cary, NC (US); Gary William Reiss, Buford, GA (US); Eduardo Morales, Key Biscayne, FL (US); Nancy Anne Greco, Lagrangeville, NY (US); David Alvra Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/455,834

(22) Filed: Jun. 28, 2019

(65) Prior Publication Data

US 2020/0413189 A1    Dec. 31, 2020

(51) Int. Cl.
*H04R 3/00* (2006.01)
*B64C 39/02* (2006.01)
*G06N 3/08* (2006.01)
*A63B 24/00* (2006.01)
*G06T 7/292* (2017.01)
(Continued)

(52) U.S. Cl.
CPC ......... *H04R 3/005* (2013.01); *A63B 24/0021* (2013.01); *B64C 39/024* (2013.01); *G06N 3/088* (2013.01); *A63B 71/0605* (2013.01); *A63B 2024/0025* (2013.01); *B25J 18/02* (2013.01); *B64C 2201/127* (2013.01); *G05D 1/0038* (2013.01); *G06T 7/292* (2017.01); *H04N 5/23203* (2013.01)

(58) Field of Classification Search
CPC ................ H04R 3/005; A63B 24/0021; A63B 2024/0025; A63B 71/0605; B64C 39/024; B64C 2201/127; G06N 3/088; H04N 5/23203; H04N 5/04; G06T 7/70; G06T 2201/10016; B25J 18/02; G05D 1/0038
See application file for complete search history.

(56) References Cited

U.S. PATENT DOCUMENTS 6,570,078 B2    5/2003    Ludwig
2005/0120870 A1    6/2005    Ludwig
(Continued)

FOREIGN PATENT DOCUMENTS

CN    104915969 A  *  9/2015

OTHER PUBLICATIONS

Morgan et al, Predicting Shot locations in tennis using spatiotemporal data, (Year: 2013).*

(Continued)

*Primary Examiner* — Davetta W Goins
*Assistant Examiner* — Kuassi A Ganmavo
(74) *Attorney, Agent, or Firm* — David B. Woycechowsky

(57) ABSTRACT

An audio forecasting algorithm that is adjusted (or trained), by machine learning, prior to a sports contest that will be broadcast. The audio forecasting algorithm is then used to position a set of mobile microphones on an ongoing basis during the sports contest. In some embodiments, a band forecasting algorithm is used in the audio forecasting algorithm. In some embodiments, a swarm based correlation algorithm is used in the audio forecasting algorithm.

18 Claims, 8 Drawing Sheets

(51) Int. Cl.
*G05D 1/00* (2006.01)
*H04N 5/232* (2006.01)
*B25J 18/02* (2006.01)
*A63B 71/06* (2006.01)

(56) References Cited

U.S. PATENT DOCUMENTS

| | | | | |
|---|---|---|---|---|
| 2010/0026809 A1* | 2/2010 | Curry | ............... | H04N 5/23238 348/157 |
| 2010/0201807 A1* | 8/2010 | McPherson | ............ | F16M 11/18 348/118 |
| 2013/0230293 A1* | 9/2013 | Boyle | ............... | H04N 5/23219 386/224 |
| 2014/0315610 A1* | 10/2014 | Shachar | ................ | A63B 71/02 463/7 |
| 2016/0327950 A1* | 11/2016 | Bachrach | ................ | G06F 3/00 |
| 2017/0069214 A1 | 3/2017 | Dupray | | |
| 2017/0161913 A1* | 6/2017 | Khazanov | .......... | H04N 5/23245 |
| 2017/0220036 A1* | 8/2017 | Visser | ................ | G05D 1/0038 |
| 2017/0278519 A1 | 9/2017 | Visser | | |
| 2018/0084338 A1 | 3/2018 | Bostick | | |
| 2018/0105270 A1 | 4/2018 | Xu | | |
| 2018/0189971 A1* | 7/2018 | Hildreth | ............. | H04N 21/4781 |
| 2018/0234612 A1* | 8/2018 | Kunkel | ..................... | G06T 7/70 |
| 2018/0247567 A1* | 8/2018 | Wang | ..................... | G09B 23/34 |
| 2019/0377345 A1* | 12/2019 | Bachrach | ................ | A63B 21/00 |

OTHER PUBLICATIONS

Gajula et al Object Tracking using Orthogonal learning Particle Swam Optimization OLPSO (Year: 2018).*
Ray et al, Detection Recognition and tracking of Moving Objects from Real time Video via SP Theory (Year: 2017).*
Oz, Can Automated production replace the sports camera (Year: 2018).*
Geronazzo et al., "Do We Need Individual Head-Related Transfer Functions for Vertical Localization? The Case Study of a Spectral Notch Distance Metric", IEEE/ACM Transactions on Audio, Speech, and Language Processing, vol. 26, No. 7, Jul. 2018, 14 pages.
Guarnaccia et al., "Time Series Analysis Techniques Applied to Transportation Noise", 978-1-5386-3917-7/17, © 2017 IEEE, 2017 IEEE International Conference on Environment and Electrical Engineering and 2017 IEEE Industrial and Commercial Power Systems Europe (EEEIC / I&CPS Europe), 6 pages.
Holland et al., "Location Robust Estimation of Predictive Weibull Parameters in Short-Term Wind Speed Forecasting", 2015 IEEE International Conference on Acoustics, Speech and Signal Processing (ICASSP), Year: 2015, pp. 3996-4000.
Kovacs et al., "Real-Time Creased Approximate Subdivision Surfaces", Feb. 2009, I3D '09: Proceedings of the 2009 symposium on Interactive 3D graphics and games, ACM, 6 pages.
Mao et al., "Indoor Follow Me Drone", MobiSys '17, Jun. 19-23, 2017, Niagara Falls, NY, USA., Copyright 2017 ACM. ISBN 978-1-4503-4928-4/17/06, 14 pages, DOI: http://dx.doi.org/10.1145/3081333.3081362.
Taylor et al., "RESound: Interactive Sound Rendering for Dynamic Virtual Environments", MM'09, Oct. 19-24, 2009, Beijing, China, Copyright 2009 ACM 978-1-60558-608-3/09/10, 10 pages.

* cited by examiner

TENNIS DATA

800

| TRUE LABEL AXIS | | | | | | |
|---|---|---|---|---|---|---|
| SERVE — | 0.92 | 0.06 | 0.00 | 0.02 | 0.00 | 0.00 |
| FOREHAND — | 0.05 | 0.87 | 0.00 | 0.08 | 0.00 | 0.00 |
| NET STRIKE — | 0.00 | 0.09 | 0.91 | 0.00 | 0.00 | 0.00 |
| BACKHAND — | 0.00 | 0.02 | 0.00 | 0.98 | 0.00 | 0.00 |
| BOUNCE — | 0.08 | 0.03 | 0.00 | 0.02 | 0.85 | 0.03 |
| FEET — | 0.00 | 0.00 | 0.00 | 0.00 | 0.00 | 1.00 |
| | SERVE | FOREHAND | NET STRIKE | BACKHAND | BOUNCE | FEET |

PREDICTED LABEL AXIS

FIG. 8

TENNIS ENSEMBLE 900

TRUE LABEL AXIS

| | SERVE | NET STRIKE | BACKHAND | BOUNCE | FOREHAND | FEET |
|---|---|---|---|---|---|---|
| SERVE — | 0.79 | 0.00 | 0.11 | 0.00 | 0.11 | 0.00 |
| NET STRIKE — | 0.00 | 0.67 | 0.17 | 0.00 | 0.17 | 0.00 |
| BACKHAND — | 0.15 | 0.04 | 0.26 | 0.00 | 0.56 | 0.00 |
| BOUNCE — | 0.09 | 0.00 | 0.00 | 0.61 | 0.27 | 0.03 |
| FOREHAND — | 0.33 | 0.00 | 0.28 | 0.03 | 0.38 | 0.00 |
| FEET — | 0.00 | 0.33 | 0.00 | 0.22 | 0.11 | 0.33 |

PREDICTED LABEL AXIS

FIG. 9

FORECASTING SOUND IN A LIVE PERFORMANCE TO DETERMINE MICROPHONE POSITION

BACKGROUND

The present invention relates generally to the field of sound recording of live performances (for example, capturing live audiovisual for a live broadcast of a sport events).

The Wikipedia entry for machine learning (as of 28 Apr. 2019) states as follows: "Machine learning (ML) is the scientific study of algorithms and statistical models that computer systems use to effectively perform a specific task without using explicit instructions, relying on patterns and inference instead. It is seen as a subset of artificial intelligence. Machine learning algorithms build a mathematical model based on sample data, known as "training data", in order to make predictions or decisions without being explicitly programmed to perform the task. Machine learning algorithms are used in a wide variety of applications, such as email filtering, and computer vision, where it is infeasible to develop an algorithm of specific instructions for performing the task. Machine learning is closely related to computational statistics, which focuses on making predictions using computers. The study of mathematical optimization delivers methods, theory and application domains to the field of machine learning. Data mining is a field of study within machine learning, and focuses on exploratory data analysis through unsupervised learning. In its application across business problems, machine learning is also referred to as predictive analytics."

Machine learning typically includes an "apply part" and a "mechanism for training." The apply part of machine learning and the mechanism for training are understood to be very different things because the training part consists of a learning process. This is distinctly different than the application of the model. During the apply portion of machine learning generally, a learning process is not used. Instead, the output of a model is typically obtained, and algorithms/processes like Newton Raphson, SGD (Stochastic Gradient Descent), regularization and the like are not used.

US patent application 2018/0234612 ("Kunkel") discloses as follows: "[A]utomatically positioning a content capturing device are disclosed. A vehicle, e.g., an UAV, carries the content capturing device, e.g., a camcorder. The UAV can position the content capturing device at a best location for viewing a subject based on one or more audio or visual cues. The UAV can follow movement of the subject to achieve best audio or visual effect . . . . The content analyzer can receive, from a rule database, one or more cinematography rules to be applied to digital images of the event. The rule database can be populated by user input, default artistic settings, various visual effects, output of an application program, or any combination of the above. For example, a first rule specified for the event can be dedicating X percent (e.g., 5%) of live video time to a headshot of a performer. A second rule specified for the event can be applying dolly zoom (sometimes referred to as Hitchcock zoom) to a performer once in the live video of the event. In some implementations, the rule database can be populated by machine learning algorithms, deep learning algorithms, or both. For example, the content analyzer can analyze previously captured content, e.g., from rehearsal or previous similar events, or analyze current content on the fly while the current event is in progress and determine artistic composition for capturing visual and audio content going forward." (Reference numerals omitted)

SUMMARY

According to an aspect of the present invention, there is a method, computer program product and/or system that performs the following operations (not necessarily in the following order): (i) providing an initial version of an audio forecast program that is programmed to predict optimal position(s) for a set of mobile microphone(s) in real time during sports play; (ii) conducting some training phase sports play (TPSP), using the initial version of the audio forecast program to position the set of mobile microphone(s) and obtain a plurality of training results; (iii) for each given training result of the plurality of training results, evaluating the given training result to obtain a plurality of evaluation results respectively corresponding to the training results; (iv) using the plurality of evaluation results to adjust data and/or code in the initial version of the audio forecast program to obtain a trained version of the audio forecast program; and (v) using the trained version of the audio forecast program to position the set of mobile microphone(s) at a first broadcasted sports event.

According to an aspect of the present invention, there is a method, computer program product and/or system that performs the following operations (not necessarily in the following order): (i) receiving a set of input data set including information related to an on-going event; (ii) applying a swarm based correlation forecasting algorithm input data set to determine a first set of position(s) respectively for a set of mobile microphone(s), with the swarm based correlation forecasting algorithm providing correlation between elements of each within band forecasting so that patterns of similarity are regressed back into time to provide a further forecast for each correlated band; (iii) communicating the first set of position(s) to a microphone positioning subsystem; and (iv) positioning, by the microphone positioning subsystem, the first set of microphone(s) according to the first set of positions.

BRIEF DESCRIPTION OF THE DRAWINGS

FIG. 8 is a table generated by the second embodiment system;

FIG. 9 is a table generated by the second embodiment system; and

DETAILED DESCRIPTION

Figure 1:
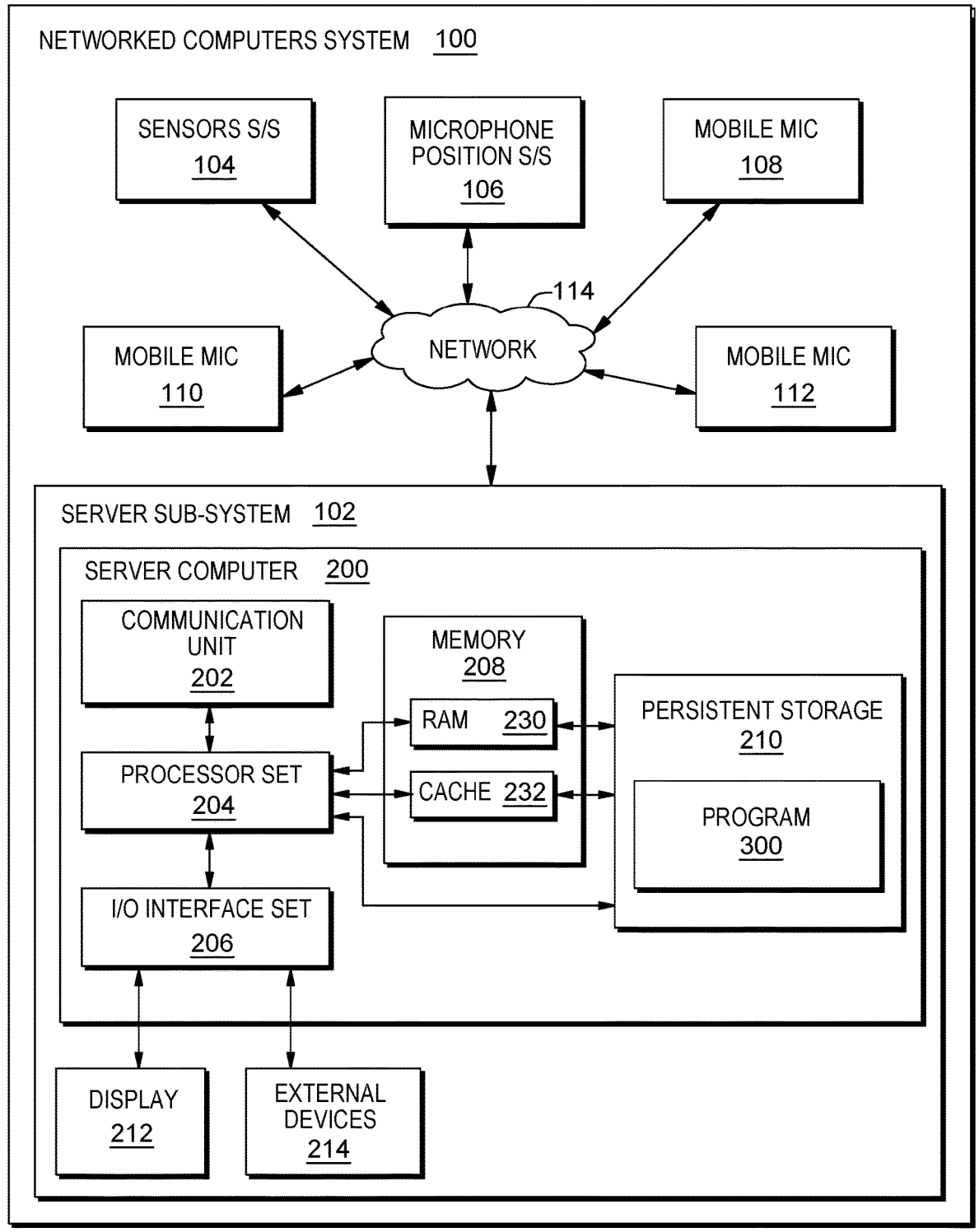
FIG. 1 is a block diagram view of a first embodiment of a system according to the present invention.

Some embodiments of the present invention are directed to an audio forecasting algorithm that is adjusted (or trained), by machine learning, prior to a sports contest that will be broadcast. The audio forecasting algorithm is then used to position a set of mobile microphones on an ongoing basis during the sports contest. In some embodiments, a band forecasting algorithm is used in the audio forecasting algorithm. In some embodiments, a swarm based correlation algorithm is used in the audio forecasting algorithm. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server subsystem 102; sensors for subsystem 104; microphone position subsystem 106; mobile microphone 108; mobile microphone 110; mobile microphone 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Subsystem 102 is, in many respects, representative of the various computer subsystem(s) in the present invention. Accordingly, several portions of subsystem 102 will now be discussed in the following paragraphs.

Subsystem 102 may be a laptop computer, tablet computer, netbook computer, personal computer (PC), a desktop computer, a personal digital assistant (PDA), a smart phone, or any programmable electronic device capable of communicating with the client subsystems via network 114. Program 300 is a collection of machine readable instructions and/or data that is used to create, manage and control certain software functions that will be discussed in detail, below, in the Example Embodiment sub-section of this Detailed Description section.

Subsystem 102 is capable of communicating with other computer subsystems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
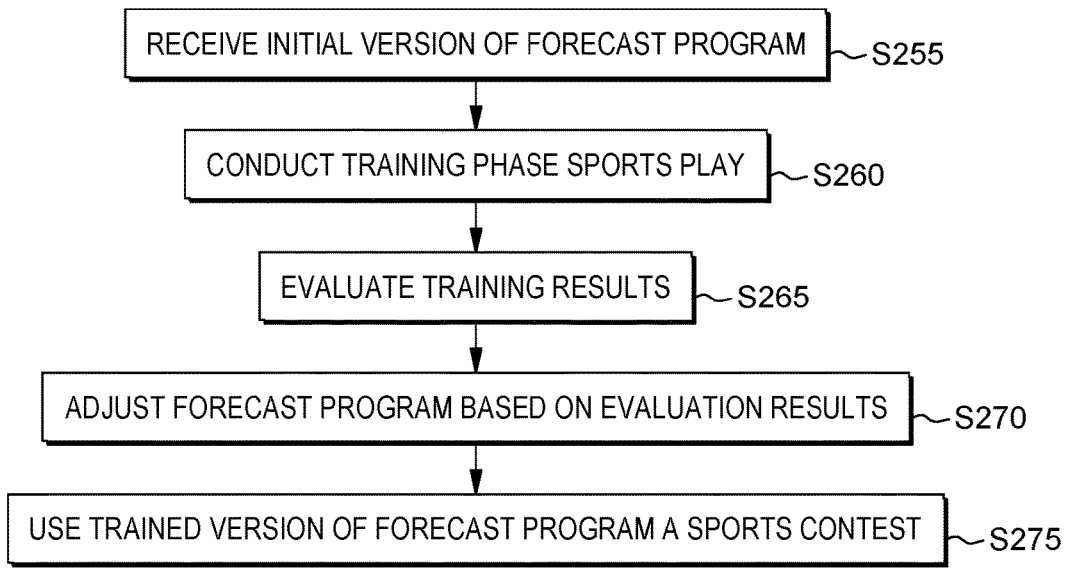
FIG. 2 is a flowchart showing a first embodiment method performed, at least in part, by the first embodiment system.
Figure 3:
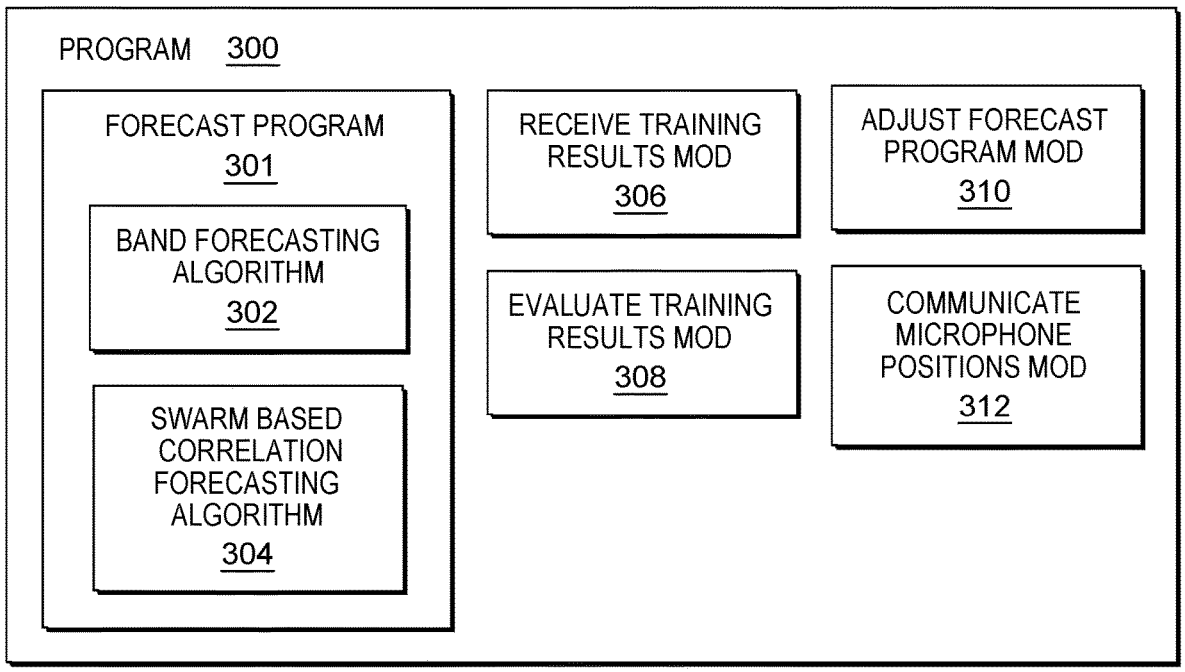
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where an initial version of audio forecast program 301 is received into larger program 300. Audio forecast program 301 includes band forecasting algorithm 302 and audio swarm correlation forecasting algorithm 304. The band forecasting algorithm and audio swarm correlation forecasting algorithm aspects of the present invention will be further discussed in the next subsection of this Detailed Description section. The purpose of audio forecast program 301 is to provide positioning data to microphone position subsystem 106, during a sports contest or other event, so that microphone position subsystem 106 can move mobile microphones 108, 110, 112 on an ongoing basis, and in a dynamic fashion, during the event so that the microphones do the best possible job in picking up audio from the event. In this example, the set of mobile microphones is used to pick up audio for a broadcast of a bowling championship.

Figure 4:
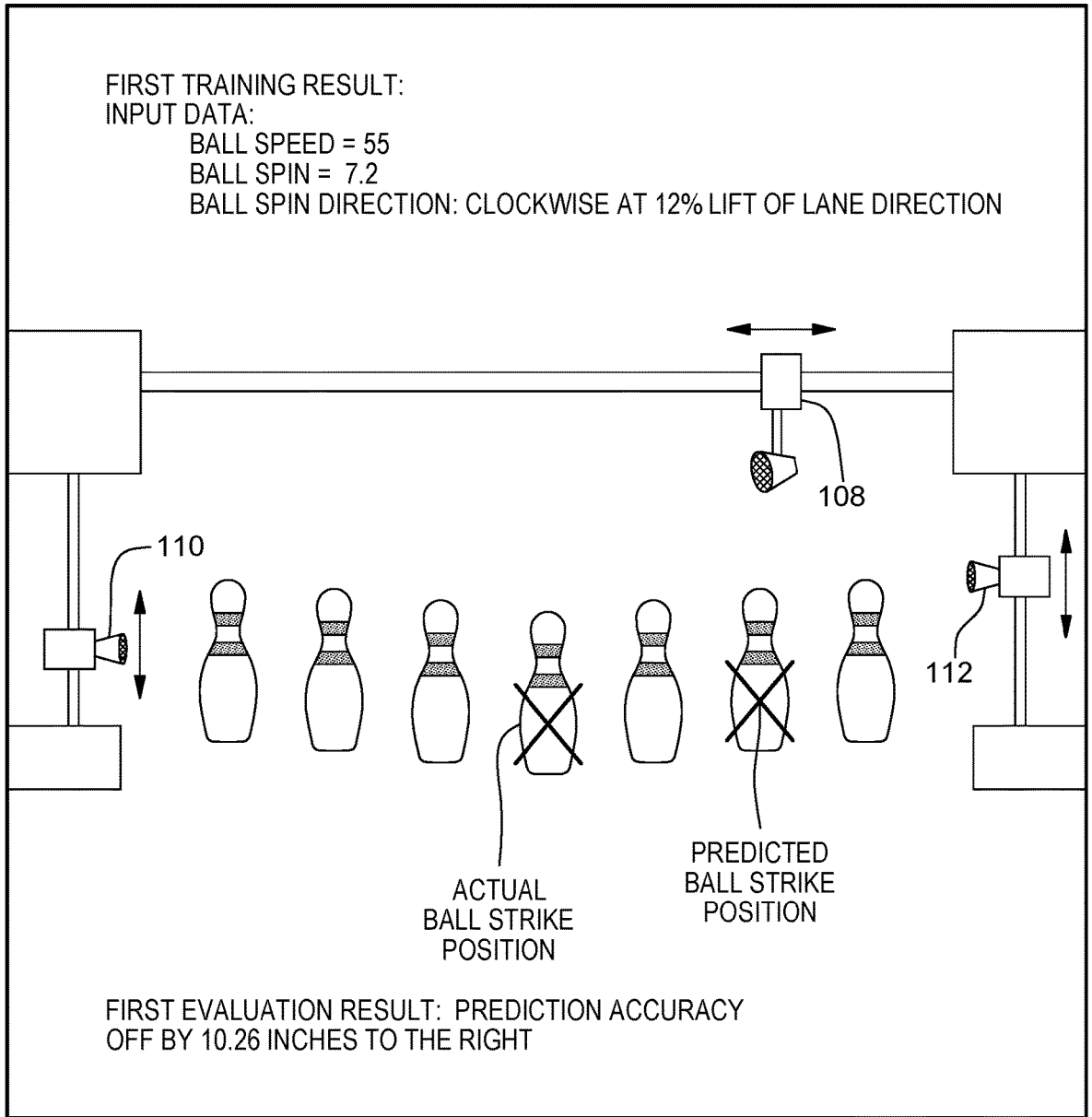
FIG. 4 is a screenshot view generated by the first embodiment system.

Processing proceeds to operation S260, where training results are received by receive training results module ("mod") 306. More specifically, some training phase sports play is conducted to generate training results in order to train forecast program 301. In this example, the training phase sports play is a practice bowling session conducted by bowlers who will later participate in the championship tournament for broadcast on broadcast television. During this training phase sports play, sensors subsystem 104 generates training data input values for each of the practice bowling throws. In this example, the training data input values include: bowling ball speed, bowling ball spin speed and a bowling ball spin direction (see FIG. 4 at screenshot 400). In this example, each training data set further includes positional predictions made by forecast program 301 based on the training data input values for each bowling throw. An example of such a positional prediction is shown in screenshot 400 at the spot market predicted ball strike position. To further explain, based on the training data input values shown in screenshot 400, the initial version of forecast program 301 predicted that the bowling ball would strike the pins at the "predicted ball strike position." In this example, the training data input values and the associated positional prediction make up one training data set.

Processing proceeds to operation S265, where evaluate training results mod 308 evaluates each training data set to determine how accurate the positional predictions for the training data set were. In this example the evaluation of each training data set is performed automatically by software according to an unsupervised machine learning paradigm. Alternatively, this evaluation could involve human judgment and/or intervention under a supervised machine learning paradigm. In order to evaluate a training data set, in addition to the training data set itself, additional information is needed to evaluate how accurate the positional prediction was. In this example, sensors subsystem 104 sends information indicative of the actual location of each bowling ball strike corresponding to each training data set. This is shown at the spot market actual ball strike position in screenshot 400.

As can be seen in screenshot 400, the predicted ball strike position and associated location of mobile microphone 108, is substantially different than the actual ball strike position. More specifically, for this training data set evaluate training results mod 308 determines that the prediction accuracy was off by 10.26 inches to the right. Viewed in isolation, this single training data set and single associated evaluation may not be that helpful. However, when combined with numerous training data sets obtained during training phase sports play, the accumulative result of numerous training data sets and numerous evaluations can be helpful in improving the accuracy of positional predictions to be used for optimal microphone placement during the later broadcast of the bowling tournament.

Processing proceeds to operation S270, where adjust forecast program mod 310 adjust the band forecasting algorithm and the swarm based correlation forecasting algorithm of forecast program 301 in accordance with the evaluation results obtained at operation S265. In this example, this adjustment of the forecast program is performed by software and without any substantial human intervention under an unsupervised machine learning paradigm. Alternatively, there could be human interventions in making these code adjustments to forecast program 301 under a supervised machine learning paradigm. After adjusting the data and/or code in the initial version of forecast program 301, a trained version of forecast program 301 is thereby obtained.

Processing proceeds to operation S275, where the trained version of forecast program 301 is used to position mobile microphones 108, 110, 112 during the broadcast of the bowling tournament. In order to do this: (i) sensors subsystem 104 provides input data for each bowling throw as it occurs in real time; (ii) the trained version of forecast program 301 uses band forecasting algorithm 302 and swarm based correlation forecasting algorithm 304 to predict the best positions for each of the mobile microphones 108, 110, 112; (iii) communicate microphone positions mod 312 communicates these best predicted positions to microphone position subsystem 106 through communication network 114; (iv) microphone position subsystem 106 (see FIG. 1) positions each of the microphones according to the best predicted positions; and (v) microphones 108, 110, 112 record the audio of the bowling ball striking the pins for the television broadcast of the bowling tournament. In some embodiments, further training of forecast program 301 may occur during the broadcasted sports contest.

III. Further Comments and/or Embodiments

Some embodiments of the present invention forecast optimal microphone locations for sports events during a training phase, which is to say, before the sporting event of interest occurs. To perform the training, there is a practice sporting event, or scrimmage, that will likely be similar in its mechanics and sound generation to the "real" sporting event that is to be broadcast later. The sound signatures received during the training session are evaluated to determine how closely the forecasted microphone positions match actual, optimal microphone positions. Then this training is used to adjust parameters in the forecasting program to improve forecast results in the future. That way, when the "real" sports event starts, the forecasting software will forecast better positions for the mobile microphone(s) so that they pick up sounds of the "real" sports event better than they would if the forecasting program had not been trained and not used machine learning.

Some embodiments of the present invention use "band forecasting." Band forecasting is hereby defined as: a signal is broken in frequency bands based on hertz, frequency or any other trait that can stratify a signal. The signal segmentations are then regressed and projected into the future. The projections are forecasts in each data segmentation.

In some band forecasting embodiments of the present invention, the band forecasting algorithm has M bands, where M is equal to a number of times an overall signal can be divided by the longest average sound that is being detected. For example, if the sound signal is 10 seconds and the sound of a tennis hit is 1 second, then 10 bands will be created.

Some embodiments of the present invention use "swarm based correlation forecasting." Swarm based correlation forecasting is hereby defined as: any algorithm that provides correlation between elements of each within band forecasting. The patterns of similarity are regressed back into time to provide a further forecast for each correlated band. A swarm is an aggregation of forecasts based on correlated groups of bands.

Some embodiments of the present invention recognize the following facts, potential problems and/or potential areas for improvement with respect to the current state of the art: (i) humans experience many different kinds of sounds within an event that change over the course of the action; (ii) the changing sound can be from reactions in the crowd, fatigue from a source or the changing surface conditions of the action; (iii) if each of these types of variables could be forecasted into the future, acoustic acquisition devices could be preemptively moved to get a highly accurate sound signal; (iv) automated techniques of interpreting the sound signal could also be an indicator or driver as to when a microphone should be moved and where; (v) a set of UAVs can be used to move the microphones to a specified location for high resolution sound; (vi) overall, the interpretation of the sound will improve (interpretation of sound means the application of feature extraction on the sound and the application of a model—the accuracy of the model given the sound and ground truth provides an interpretation); (vii) acoustic modeling of sensitive or far away events that require noninvasive sound acquisition needs to move through an event for optimal signal; (viii) traditionally, microphones are placed in static locations to listen to action; (ix) however, as the action progresses, the source of sound changes (for example, changes caused by increasing fatigue tennis players over the course of a tennis match) and the background noise during an event can degrade the signal; and/or (x) known solutions (for example, manual placement of microphones, ad hoc movement of microphones and digital signal amplification) can be improved upon.

Some embodiments of the present invention may include one, or more, of the following features, characteristics, operations and/or advantages: (i) forecasted acoustic modeling performance for unmanned aerial vehicle (UAV) based ear location; (ii) measuring how the source of the sound and background are changing; (iii) these two components are then forecasted into the future so that a UAV can move to an optimal location to acquire the best signal; (iv) the machine learning aspects learn over time from forecasted values how to drive a UAV to the best location to listen to the action; (v) the phase shift of the sound can contribute to forecasted location toward which the UAV should navigate (sometimes herein referred to as "sound localization" which is the process of determining the origin of a sound); (vi) AI (artificial intelligence) based driving of UAVs based on sound; (vii) AI based localization of the placement of microphones; (viii) AI based forecasting of microphone placement; and/or (ix) use of UAVs to acquire sound based on acoustic modeling performance.

Figure 5:
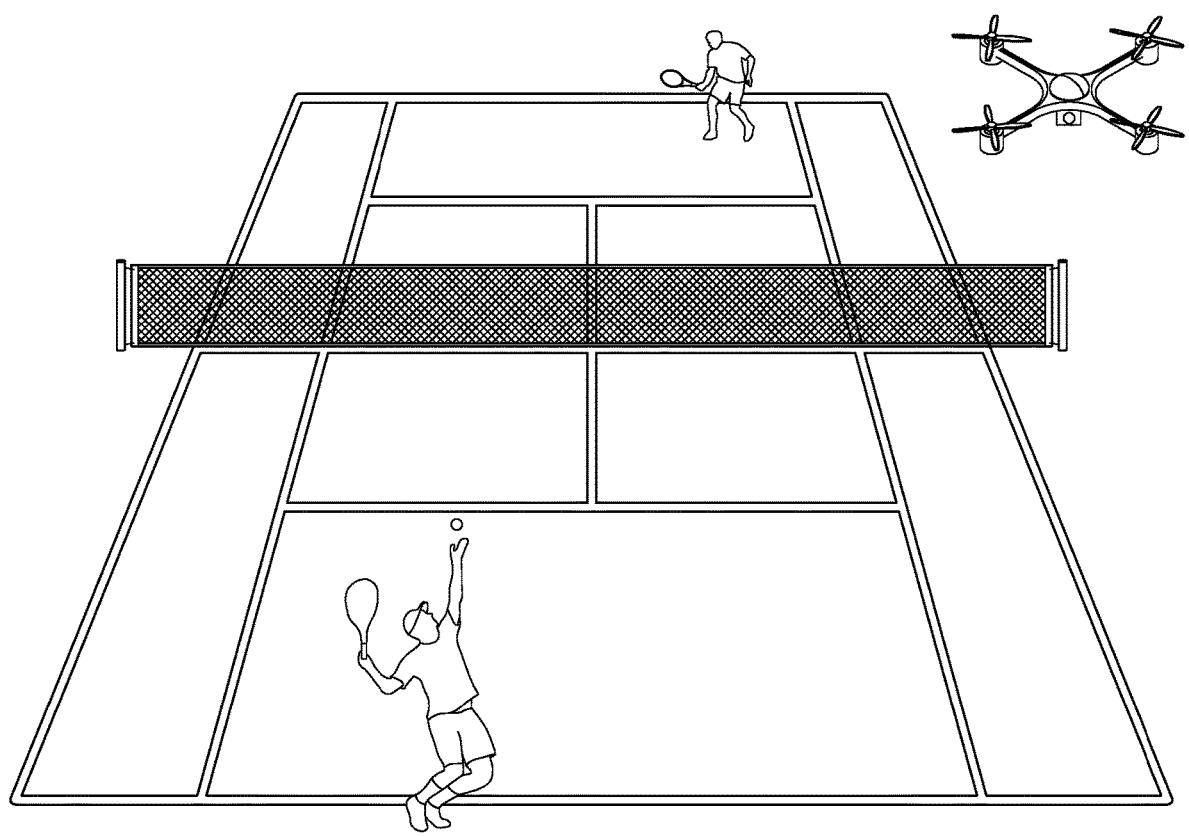
FIG. 5 is a perspective view of a portion of a second embodiment of a system according to the present invention.

FIG. 5 shows screenshot 500 where a UAV is positioning itself to record sound generated by a tennis match, where the positioning of the UAV is performed by machine logic according to an embodiment of the present invention. In some embodiments, there may be a group of UAVs at the event. The UAVs listen with microphones and send signals back to the AI ear or other machine logic of an ensemble of models that are interpreting sound. The sounds are classified by an ensemble of models that include CNN (convolution on normal network), HMM (Hidden Markov Model), and etc.

Figure 6:
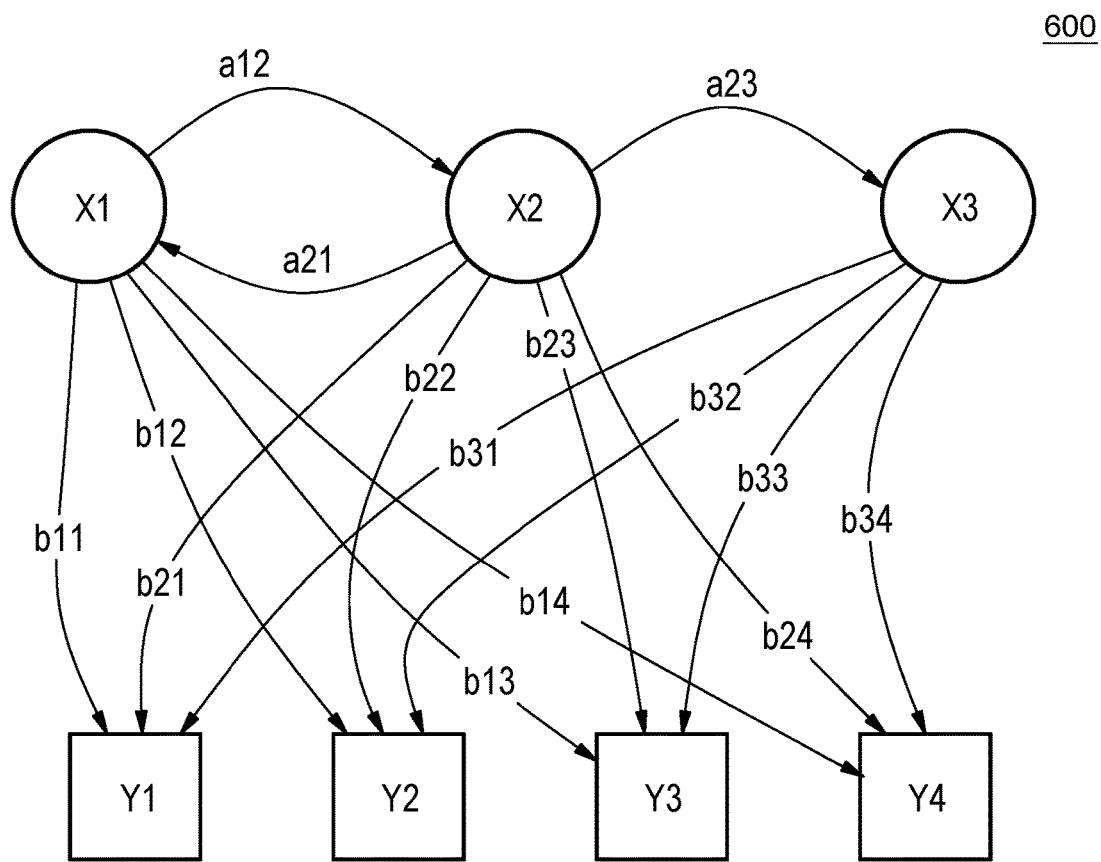
FIG. 6 is a block diagram helpful in understanding various embodiments of the present invention.

FIG. 6 shows diagram 600 which represents a Hidden Markov Model as may be used by some embodiments of the present invention. In diagram 600, circular blocks X1, X2, X3 represent interpretable states of the sounds. For example, some embodiments move from one state to another based on the class that is detected. In diagram 600, blocks y1, y2, y3 and y4 can be understood as follows: the blocks going downwards, look at the aspects of the sound such as the cepstral features, velocity and acceleration of change of the sound. In diagram 600, paths a12, a21 and a23 represent: the horizontal paths provide transitions to additional observable states given another observable state. In diagram 600, paths b11, b12, b13, b14, b21, b22, b23, b24, b31, b32, b33 and b34 represent edges between the observable and nonobservable states. Each observable state has the potential to influence the nonobservable state.

Figure 7:
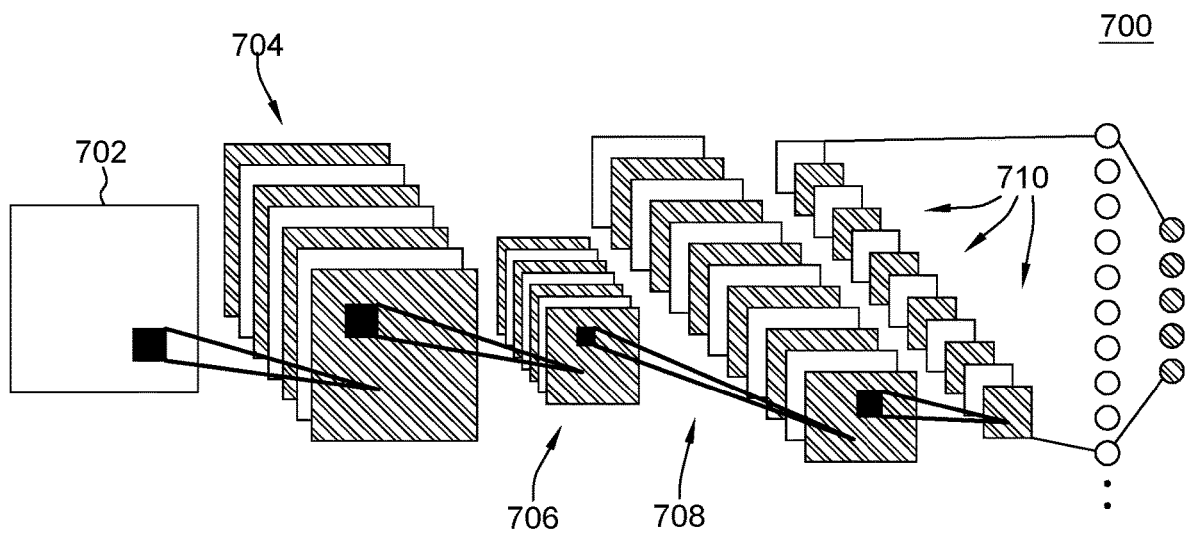
FIG. 7 is a block diagram helpful in understanding various embodiments of the present invention.

FIG. 7 shows diagram 700, which includes: input layer 702; first convolutional layer 704 (representing feature maps); first pooling layer 706 (representing pooled feature maps); second convolutional layer 708 (representing feature maps); and a second cooling layer 710 (representing pooled feature maps). Diagram 700 represents a CCN as may be used by some embodiments of the present invention.

FIG. 8 shows tennis data table 800. FIG. 9 shows tennis ensemble table 900. The difference between the tables show the results of one drone or acquisition. Table 900 shows how some embodiments can combine different inputs from microphones to achieve different results.

Through the correlation of visual recognition, a set of sounds are determined if they are accurate. If the number of false positives and false negatives increases, then the system has an indicator that the sound has degraded. The sound components are forecasted into the future. The future values are input into the models for trended accuracy metrics into the future. If the metrics are regressed to degrade, the UAVs need to improve the sound acquisition location.

The forecasted values of the sound are used to determine the sound localization or the place of origin of the sound. A deep CNN is used to localize the sound to determine the general region the UAVs should target. Each UAV will have a separate sound channel and measurement. As a result, each UAV could localize the sound difference since there could be multiple objects, which increases the spreads of the UAVs. Next, the domain constraints are added to the location targets. For example, in tennis (and in other sporting events), the UAVs should not obstruct play.

Next, a multiple objective function is used for the population of UAVs to determine the placement of each UAV. The UAVs physically move to the determined location and the cycle continues.

Figure 10:
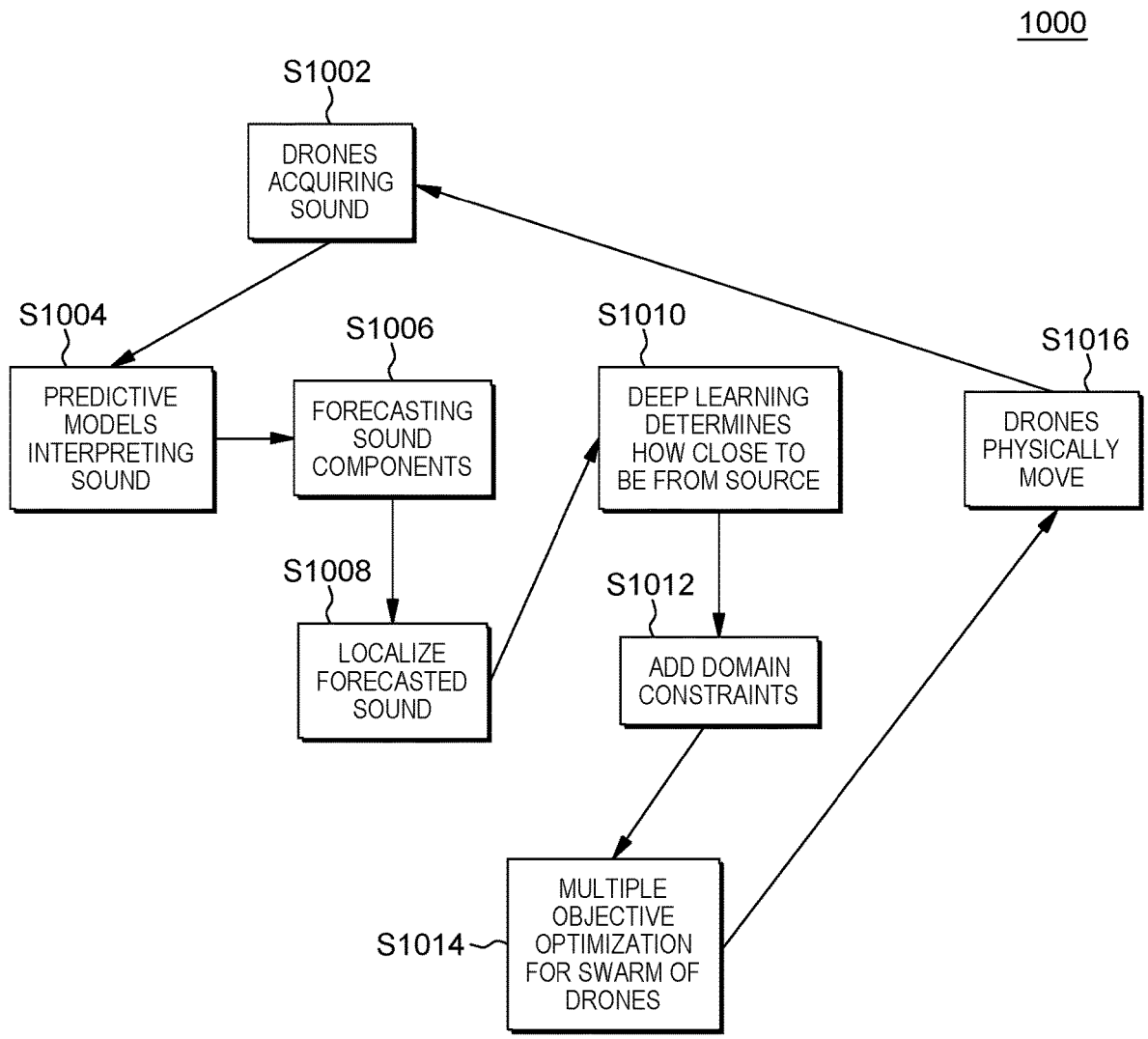
FIG. 10 is a flowchart showing a second embodiment method performed, at least in part, by the second embodiment system.

FIG. 10 shows flowchart 1000 including the following operations (with process flow among and between the operations being as shown in FIG. 10): S1002; S1004; S1006; S1008; S1010; S1012; S1014; and S1016.

The forecasting components implement granger correlation as well as multiple regressions over sound components.

In some embodiments of the present invention, the machine logic that implements machine learning that learns from actual situations that arise during the event. As a highly simplified example, relating to a tennis match: (i) the machine logic predicts a backhand shot based on player identity, player's court position and recent history of the tennis ball position; (ii) the prediction turns out to be incorrect, as cameras and/or microphones receive data indicating that that the player unexpectedly positioned herself for a forehand and performed a forehand stroke; (iii) this information is used to continue training of the AI software; and (iv) the next time similar circumstances come up, the UAV positions itself for a forehand instead of a backhand. In some embodiments, the position of sound acquisition devices are made to optimize the quality of a particular shot for training a model. For example, a model might be great at classifying forehands but horrible with backhands. As a result, the system positions itself in a forecasted backhand shot that will optimize the sound quality of the backhand shot. This high quality exemplar would then be used for training.

The two are fundamentally different with respect the phase of machine learning and the purpose of driving the UAVs or any mobile mic. Some conventional systems position mics during the training and testing phases of models. In contradistinction, some embodiments of the present invention train the models in real time and then have testing exemplars sent to determine the precision, recall and accuracy of models to further move the mics. The forecasting component is important here because this component correlates the forecasting of sound trends with the performance of the model to determine where the UAVs should move to get better training samples. This is a difference from prior art that uses machine learning or models that have already been trained to create rules to analyze content. Some embodiments of the present invention build machine learning models and test them with forecasted data.

Some embodiments of the present invention may include one, or more, of the following features, characteristics, operations and/or advantages: (i) uses the performance of an ensemble of acoustic models to drive the location of the UAV or lift; (ii) training a model based on the acquired acoustic signatures of each UAV at each location; (iii) forecasts acoustic signals to place microphones within a location for model building before the action happens; (iv) granger forecasts neighboring UAVs for micromovements and placements of a microphone.

Some embodiments of the present invention may include one, or more, of the following features, characteristics, operations and/or advantages: (i) using artificial intelligence or analytics to predict a location where a sound will be generated (for example, sound of tennis player hitting a tennis ball); (ii) placing a microphone near the expected location of the expected source of the expected sound; (iii) transducing, by the microphone, the sound into an audio signal when it occurs as expected; (iv) the microphone is mounted on a UAV or unmanned land vehicle and the microphone is placed near the expected location of the expected sound by flight of the UAV or travel of the unmanned land vehicle; (v) uses the output of a machine learning model or models to move sound band acquisition devices or to change their band focal to support transfer transferring; (vi) the system will increase the accuracy of a model on a certain class of sounds by focusing on acquisition of that pattern at the expense of others; (vii) able to find sources that forecast hyperspectral sound signatures around each component to drive the placement of microphones nor the channels of the hyperspectral sound for each microphone to listen on; (viii) each of the microphones are correlated and forecasted further for micro movements; and/or (ix) evaluates the results of a machine learning model to determine if the fused hyperspectral bands are discovering an acquisition coverage to further train the model.

Some embodiments of the present invention may include one, or more, of the following features, characteristics, operations and/or advantages: (i) uses forecasting, machine learning results/training or hyperspectral band coverage and fusion uses machine learning, transfer learning, forecasting, hyperspectral sound band fusion and correlation with a plurality of sound acquisition devices; (ii) devices do not have to move, they just need to focus on specific bands; (iii) drives the acquisition of bands of sound to enhance the machine learning and transfer learning of model; (iv) forecast and change sound bandwidth focal points; (v) drives the acquisition of sound bands based on the class we want to learn and transfer into a machine learning model; (vi) positions mics during the training and testing phases of models; (vii) trains the models in real time and then have testing exemplars sent to determine the precision, recall and accuracy of models to further move the mics; and/or (viii) correlates the forecasting of sound trends with the performance of the model to determine where the UAVs should move to get better training samples.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving a set of input data set including information related to an on-going event;
applying a swarm based correlation forecasting algorithm to data of the input data set to determine a first set of position(s) respectively for a set of mobile microphone(s), with the swarm based correlation forecasting algorithm providing correlation between elements of each within band forecasting so that patterns of similarity are regressed back into time to provide a further forecast for each correlated band;
communicating the first set of position(s) to a microphone positioning subsystem; and
positioning, by the microphone positioning subsystem, the set of mobile microphone(s) according to the first set of positions;
wherein the swarm based correlation forecasting algorithm has M bands, where M is equal to a number of times an overall signal can be divided by the longest average sound that is being detected.

2. The CIM of claim 1 wherein the event is a sports contest.

3. The CIM of claim 1 further comprising adjusting the swarm based correlation forecasting algorithm based on unsupervised machine learning.

4. The CIM of claim 1 further comprising adjusting the swarm based correlation forecasting algorithm based on supervised machine learning.

5. The CIM of claim 1 wherein the set of microphone(s) include a plurality of microphones respectively mounted on a plurality of unmanned aerial vehicles.

6. The CIM of claim 1 wherein the input data set includes at least the following types of events related information: positions of players in a sports contest, speed of players in the sports contest, direction of movement of players in the sports contest, position of a ball in a sports contest, speed of a ball in the sports contest, and direction of movement of a ball in the sports contest.

7. A computer program product (CPP) comprising:
a set of storage device(s) with each storage device including a set of storage medium(s); and
computer code collectively stored on a set of storage device(s), with the computer code including instructions and data for causing a processor(s) set to perform the following operations:
receiving a set of input data set including information related to an on-going event,
applying a swarm based correlation forecasting algorithm to data of the input data set to determine a first set of position(s) respectively for a set of mobile microphone(s), with the swarm based correlation forecasting algorithm providing correlation between elements of each within band forecasting so that patterns of similarity are regressed back into time to provide a further forecast for each correlated band,
communicating the first set of position(s) to a microphone positioning subsystem, and
positioning, by the microphone positioning subsystem, the set of mobile microphone(s) according to the first set of positions;
wherein the swarm based correlation forecasting algorithm has M bands, where M is equal to a number of times an overall signal can be divided by the longest average sound that is being detected.

8. The CPP of claim 7 wherein the event is a sports contest.

9. The CPP of claim 7 wherein the computer code further includes data and instructions for causing the processor(s) set to perform the following operation(s):
adjusting the swarm based correlation forecasting algorithm based on unsupervised machine learning.

10. The CPP of claim 7 wherein the computer code further includes data and instructions for causing the processor(s) set to perform the following operation(s):
adjusting the swarm based correlation forecasting algorithm based on supervised machine learning.

11. The CPP of claim 7 wherein the set of microphone(s) include a plurality of microphones respectively mounted on a plurality of unmanned aerial vehicles.

12. The CPP of claim 7 wherein the input data set includes at least the following types of events related information: positions of players in a sports contest, speed of players in the sports contest, direction of movement of players in the sports contest, position of a ball in a sports contest, speed of a ball in the sports contest, and direction of movement of a ball in the sports contest.

13. A computer system (CS) comprising:
a processor(s) set:
a set of storage device(s) with each storage device including a set of storage medium(s); and
computer code collectively stored on a set of storage device(s), with the computer code including instructions and data for causing the processor(s) set to perform the following operations:
receiving a set of input data set including information related to an on-going event,
applying a swarm based correlation forecasting algorithm to data of the input data set to determine a first set of position(s) respectively for a set of mobile microphone(s), with the swarm based correlation forecasting algorithm providing correlation between elements of each within band forecasting so that patterns of similarity are regressed back into time to provide a further forecast for each correlated band,
communicating the first set of position(s) to a microphone positioning subsystem, and
positioning, by the microphone positioning subsystem, the set of mobile microphone(s) according to the first set of positions;
wherein the swarm based correlation forecasting algorithm has M bands, where M is equal to a number of times an overall signal can be divided by the longest average sound that is being detected.

14. The CS of claim 13 wherein the event is a sports contest.

15. The CS of claim 13 wherein the computer code further includes data and instructions for causing the processor(s) set to perform the following operation(s):
adjusting the swarm based correlation forecasting algorithm based on unsupervised machine learning.

16. The CS of claim 13 wherein the computer code further includes data and instructions for causing the processor(s) set to perform the following operation(s):
adjusting the swarm based correlation forecasting algorithm based on supervised machine learning.

17. The CS of claim 13 wherein the set of microphone(s) include a plurality of microphones respectively mounted on a plurality of unmanned aerial vehicles.

18. The CS of claim 13 wherein the input data set includes at least the following types of events related information: positions of players in a sports contest, speed of players in the sports contest, direction of movement of players in the sports contest, position of a ball in a sports contest, speed of a ball in the sports contest, and direction of movement of a ball in the sports contest.

\* \* \* \* \*